US009628220B2

(12) United States Patent
Valliappan

(10) Patent No.: US 9,628,220 B2
(45) Date of Patent: Apr. 18, 2017

(54) REMOTE TX TRAINING WITH A RE-TIMER

(71) Applicant: BROADCOM CORPORATION, Irvine, CA (US)

(72) Inventor: Magesh Valliappan, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 252 days.

(21) Appl. No.: 14/489,346

(22) Filed: Sep. 17, 2014

(65) Prior Publication Data

US 2015/0295679 A1 Oct. 15, 2015

Related U.S. Application Data

(60) Provisional application No. 62/028,281, filed on Jul. 23, 2014, provisional application No. 61/980,017, filed on Apr. 15, 2014.

(51) Int. Cl.
*H04L 1/00* (2006.01)
*H04L 5/14* (2006.01)

(52) U.S. Cl.
CPC .......... *H04L 1/0075* (2013.01); *H04L 1/0073* (2013.01); *H04L 5/1438* (2013.01)

(58) Field of Classification Search
None
See application file for complete search history.

(56) References Cited

U.S. PATENT DOCUMENTS

| | | | | |
|---|---|---|---|---|
| 8,320,439 B2* | 11/2012 | Mobin | ............. | H04L 25/03006 333/18 |
| 2005/0021797 A1* | 1/2005 | Talaat | ..................... | H04L 49/35 709/230 |
| 2006/0045031 A1* | 3/2006 | Hickey | ................. | H04L 1/0061 370/266 |
| 2006/0067387 A1* | 3/2006 | Ahmed | ............. | H04B 10/0779 375/219 |
| 2006/0179152 A1* | 8/2006 | Baumer | .................. | H04L 12/24 709/230 |
| 2009/0219978 A1* | 9/2009 | Mobin | ............. | H04L 25/03006 375/219 |
| 2010/0020860 A1* | 1/2010 | Dai | ................... | H04L 25/03343 375/231 |
| 2013/0195154 A1* | 8/2013 | Mobin | ................ | H04L 12/6418 375/219 |
| 2013/0243011 A1* | 9/2013 | Ungerboeck | ......... | H04L 12/403 370/464 |
| 2014/0146833 A1* | 5/2014 | Lusted | .................. | H04L 12/413 370/437 |
| 2014/0241411 A1* | 8/2014 | Ghiasi | ................ | H04L 25/4904 375/231 |

\* cited by examiner

*Primary Examiner* — Chirag Shah
*Assistant Examiner* — Amar Persaud
(74) *Attorney, Agent, or Firm* — McDermott Will & Emery LLP

(57) ABSTRACT

A device for transmit (TX) training a remote link partner (LP) includes a TX retimer module adjacent to a TX port of the device, and a receive (RX) retimer module adjacent to the TX retimer module. The RX retimer module copies first control and status data to the TX retimer module, and the TX retimer module provides second control and status data for TX training of the remote LP.

14 Claims, 7 Drawing Sheets

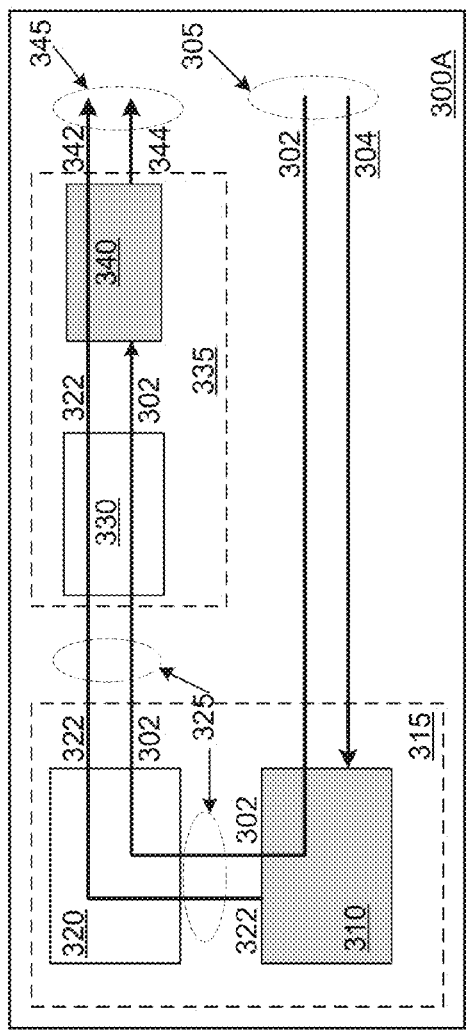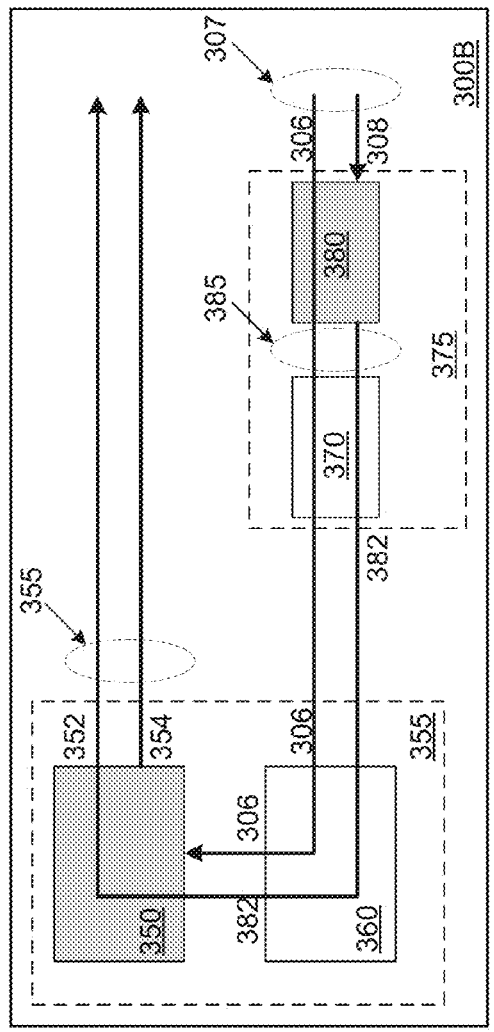
FIG. 3A
FIG. 3B

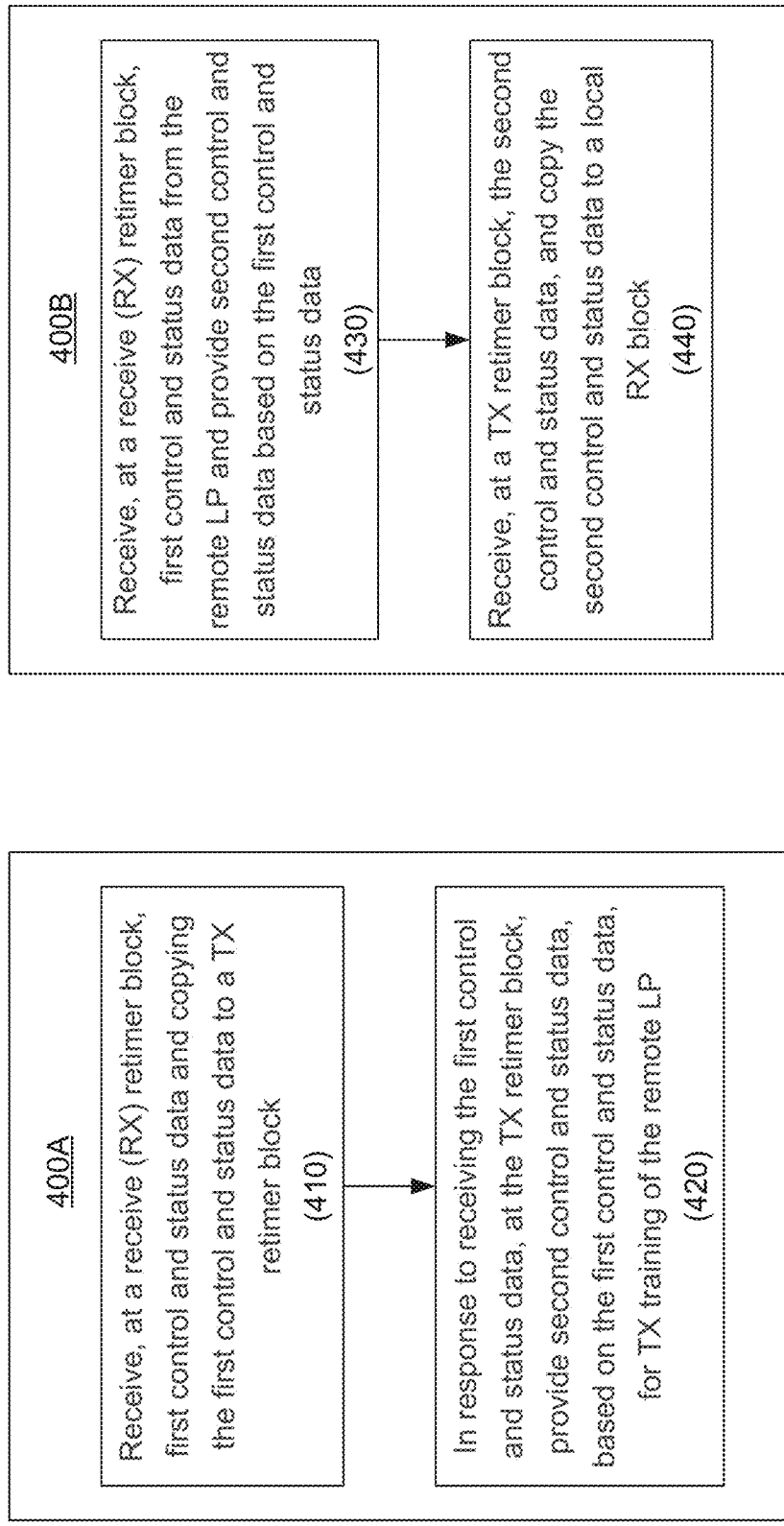

REMOTE TX TRAINING WITH A RE-TIMER

CROSS-REFERENCE TO RELATED APPLICATIONS

This application claims the benefit of priority under 35 U.S.C. §119 from U.S. Provisional Patent Applications 62/028,281, filed Jul. 23, 2014 and 61/980,017 filed Apr. 15, 2014, which are incorporated herein by reference in their entirety.

TECHNICAL FIELD

The present description relates generally to Ethernet communications, and more particularly, but not exclusively, to remote transmit (TX) training with a re-timer.

BACKGROUND

Remote transmit (TX) training is a technique used in high speed serializer-deserializer (SerDes) communication and part of the Ethernet Standard (e.g., IEEE802.3) specifications (e.g., Clause 72/93). The remote TX training is based on a point-to-point link and provides a protocol for a device to communicate, using in-band information, to a remote link partner and jointly optimize the link to achieve the best bit-error rate (BER) and significantly lower interference to adjacent channels. Existing solutions for performing remote TX training with a re-timer require some hardware components to be involved and inserted by a user. These solutions also require user software to intervene in a timely manner to remain compliant to IEEE specifications.

BRIEF DESCRIPTION OF THE DRAWINGS

Certain features of the subject technology are set forth in the appended claims. However, for purpose of explanation, several embodiments of the subject technology are set forth in the following figures.

FIGS. 3A-3B illustrate examples of devices for TX training a remote link partner (LP), in accordance with one or more implementations.

FIGS. 4A-4B illustrate examples of methods for TX training a remote LP in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some implementations, the subject technology provides methods and implementations for integrating a retimer into a system (e.g., an endpoint device such as a switch) that employs remote TX training for communication with a remote link partner (LP) without incurring additional hardware costs, for example, by using a firmware controlled scheme. The subject system can be fully transparent to the link partner, thereby avoiding Interoperability issues. Thus, the subject system can be fully contained within the integrated serializer/deserializer (SerDes) IP without any software or hardware burdening of the switch, controller, or user. Since the subject system may be implemented in firmware, the subject system allows for good debugging, as well as flexibility for updates and interoperability workarounds.

Figure 1:
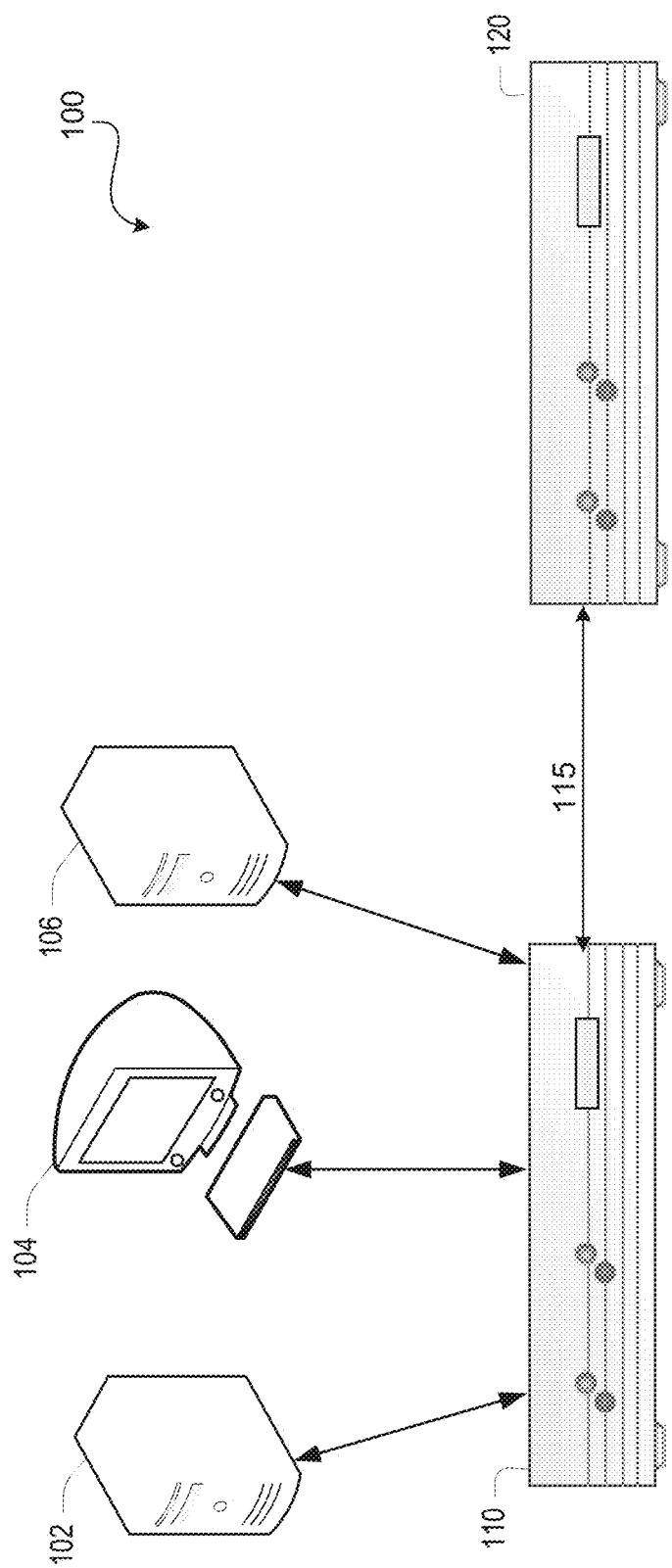
FIG. 1 is a high level diagram illustrating an example of a network environment for application of remote transmit (TX) training.

FIG. 1 is a high level diagram illustrating an example of a network environment 100 for application of remote transmit (TX) training of the subject technology. The example network environment 100 may include various electronic devices 102, 104, 106, such as one or more servers, computers, switches, routers, network components, network devices, etc. In one or more implementations, the network environment 100 may include a set of servers, a server hank, or a vast network of interconnected computers or network devices. In one or more implementations, the network environment 100 may include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more network devices, such as the switch device 110, may be implemented to facilitate communication between the one or more electronic devices 102, 104, 106 of the network environment 100. The electronic devices 102, 104, 106 of the network environment 100, may be connected or otherwise in communication with each other, through or using the switch device 110. Examples of the switch device 110 include an Ethernet switch such as upper or lower layer switches or an endpoint device. For example, the electronic devices 102, 104, 106 may each be coupled to a physical port of the switch device 110 by at least one network transmission line, such as an Ethernet transmission line, a coaxial transmission line, an optical transmission line, or generally any transmission line. In one or more implementations, one or more of the electronic devices 102, 104, 106 may be wirelessly coupled to the network device 110.

In one or more implementations, one or more of the electronic devices 102, 104, 106 may be referred to as a link partner (LP) of the switch device 110. In one or more implementations, a remote LP may include another switch device 120 coupled to the switch device 110 via a link (e.g., Ethernet link) 115. The type of the link 115 depends on the distance between the switch device 110 and 120. For example, the link 115 can be provided using an Ethernet backplane (e.g., for short distances up to 1 m), a twinax cable (e.g., for distances up to 15 m), twisted pairs (e.g., for distances up to 100 m), a multimode fiber (e.g., for distances up to 5 km), and a single-mode fiber (e.g., for distances up to 40 km). The switch devices 110 and 120 and/or one or more of the electronic devices 102, 104, 106 may implement remote transmit (TX) training. In one or more implementations, remote TX training can use a point-to-point link that provide a protocol for a receiver to communicate using in-band information to the remote transmitter and jointly optimize the link for best bit-error rate (BER) and low interference to adjacent channels. The remote TX training protocol may include 16-bits of in-band information that is transmitted in each change request and status report. At least one of the bits may include an indication of "receiver ready," (RX-ready) which may indicate that the link partner is ready to receive data. Once both ends of the link have achieved RX-ready, data traffic transmission may begin.

In one or more implementations, the switch device 120 can be placed close enough to a connector of the switch device 110 and therefore the interconnect length may be reduced. In order to extend the cable reach, an intermediate device or component, such a simplex retimer, may be inserted near the connector to extend the cable reach. In one or more implementations, a simplex retimer may be a device and/or component that is a unidirectional repeater used to extend the length of a link. In one or more implementations, only one direction of the link may use a simplex retimer, but not the other. In some implementations, both directions of the link use simplex retimers. In some aspects, the subject technology integrates a simplex retimer into a firmware controlled scheme (e.g., no additional hardware components) with full transparency to the link partner, thus avoiding interoperability issues. In one or more implementations, the simplex retimer can be physical layer aware, e.g. the retimer may operate on the physical layer.

Figure 2A:
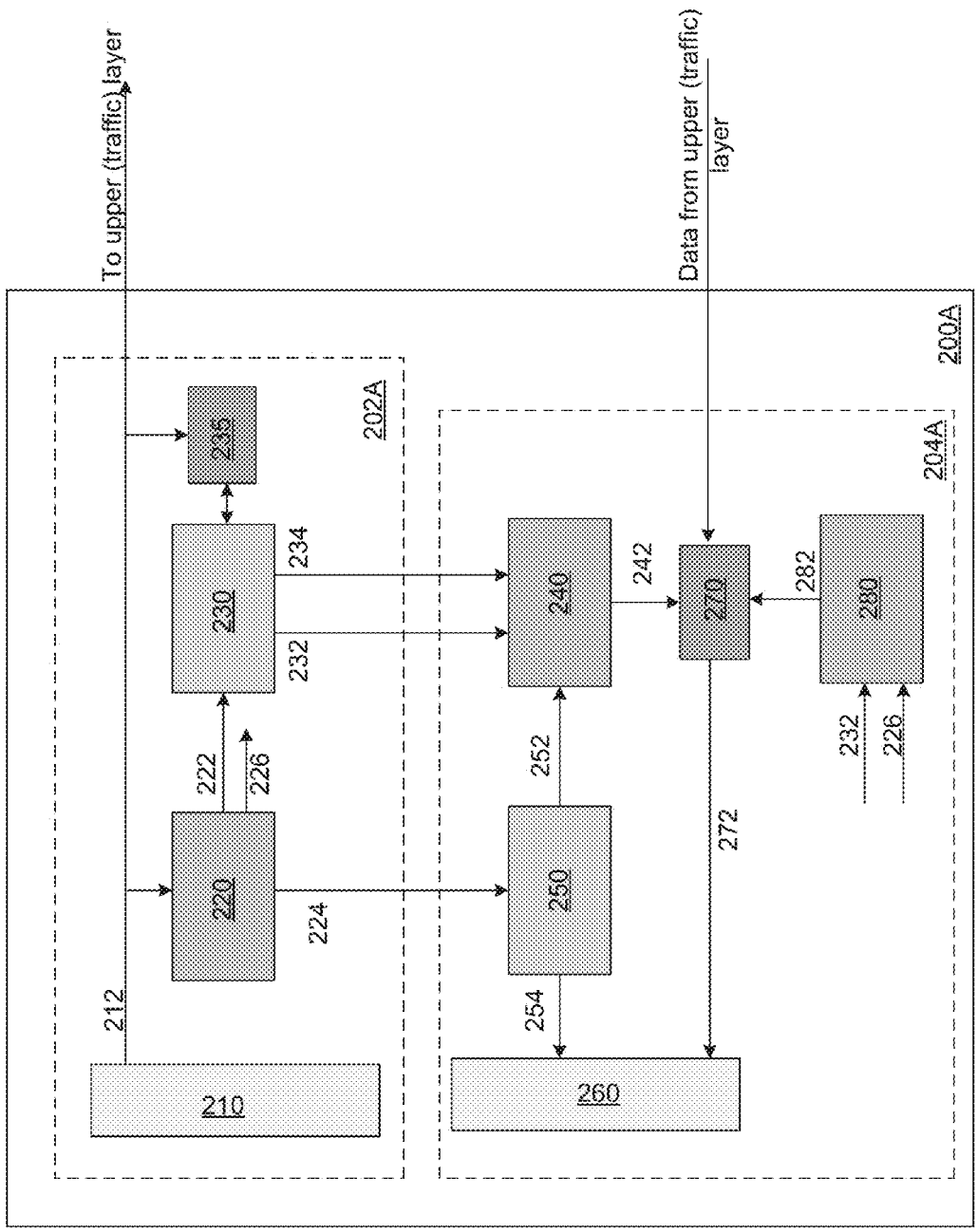
FIG. 2A is a block diagram illustrating an architecture of an Ethernet device with remote TX training capability.

FIG. 2A is a block diagram illustrating an architecture of an Ethernet device 200A with remote TX training capability. Examples of the Ethernet device 200A include an Ethernet switch device. In one or more implementations, the Ethernet device 200A is compliant with clause 72/93 of the IEEE802.3 specifications and forms one side of an Ethernet link. The Ethernet device 200A includes features that allow remote TX training. For example, the Ethernet device 200A when communicating with a transmitter can request the transmitter to change its TX equalization settings to achieve a desired bit-error rate (BER). This is because the transmitter may not be aware of the length of the link and needs receiver's feedback to enhance the quality of the transmission signal to achieve a BER at the remote LP. Existing simplex retimers, however, are not able to leverage these features to extend the reach of the Ethernet device 200A.

The Ethernet device 200A includes a receive (RX) block 202A and a TX block 204A. The RX block 202A includes an RX analog front-end (AFE) module 210, an RX decoder module 220, an RX tuning and feedback module 230, and an RX tuning hardware 235. The TX block 204A includes a TX AFE module 260, a TX finite-impulse response (FIR) control 250, a TX encoder module 240, a multiplexer (MUX) 270, and a state machine 280.

In some implementations, the RX AFE module 210 can recover the received signal (e.g., data bits) 212 from the received radio-frequency (RF) signal and sends the received signal 212 to the RX decoder module 220, the RX tuning hardware 235, and to an upper (traffic) layer. The RX decoder module 220 monitors the data received from the RX AFE module 210 and decodes the control and status information embedded in a training frame. The control and status information includes remote RX ready, which indicates when the link partner's RX is satisfied with the local transmitter settings. The RX decoder module 220 generates three signals 222, 224, and 226. The first signal 222 includes the status from the remote LP of the last request made to the remote LP by the Ethernet device 200A and is delivered to the RX tuning and feedback module 230. The second signal 224 includes requests from the remote LP to change local TX and is forwarded to the TX FIR control 250. The third signal 226 includes status of the remote LP indicating whether the remote LP is done with the training process and is ready to receive transmission from the Ethernet device 200A, and is sent to the state machine 280.

In some aspects, an RX tuning microcode of the RX tuning and feedback module 230 monitors the quality of the received signal at the local RX (e.g., RX portion of the Ethernet device 200A) and adjusts AFE settings to reduce BER. This is achieved by using the RX tuning hardware 235. The metrics used in this process are further utilized by a feedback microcode of the RX tuning and feedback module 230 to generate requests to change TX's parameters of the remote LP. This change requests are sent to the TX encoder module 240 via signal 234. The feedback microcode further determines when no further TX change requests are required and signifies that by sending local RX ready signal 232 to the TX encoder module 240.

In one or more implementations, the TX encoder module 240 receives signals 232 and 234 as well as a signal 252 from the TX FIR control module 250, which indicates the status of the request to change local TX from the remote LP. The TX encoder module 240 encodes the information derived from signals 232, 234, and 252, and sends the encoded information to the MUX 270. The MUX 270, during the startup, sends the encoded information to the data line 272 for communication to the remote LP. After the startup, the MUX 270 allows the data from the upper traffic layer to flow through the data line 272.

In some implementations, the TX FIR control 250 includes a microcode that is responsible for receiving the remote LP change requests, validate the change requests, and apply them to the local TX FIR if possible and generate a response to be sent to the remote LP. In other words, the TX FIR control 250 can control the quality of the TX signals transmitted by the TX AFE 260, based on the requests from the remote LP (e.g., signal 224), by sending the TX FIR signal 254, which can include FIR tap weights (e.g., coefficients of the FIR filter). For example, the remote LP may request that the local TX (e.g., of the Ethernet device 200A) to change its second FIR taps. The request is decoded by the RX decoder module 220 and sent to the TX FIR control module 250. The TX FIR control module 250 implements the requested change and informs the TX encoder module 240 of the status of the change. The TX encoder module 240 encodes and sends the status to the TX AFE 260 for transmission to the remote LP. The state machine 280 is responsible for switching to normal traffic after detecting that both ends of the link have achieved RX ready based on signals 232 and 226. In response to receiving signals 232 and 226, the state machine 280 sends signal 282 to the MUX 270 to cause the MUX 270 to switch to normal traffic (e.g., data from the upper traffic layer).

In some implementations, the RX tuning and feedback module 230 and TX FIR control module 250 can be realized in digital logic circuitry or firmware, while the RX decoder module 220, the TX encoder module 240, and the state machine 280 can be implemented in digital logic circuitry.

In some aspects, the subject technology introduces a simplex retimer in either the TX or RX path. The introduction of the simplex retimer causes a physical separation of the RX and TX SerDes that forms a link with the remote LP, which can lead to problems in implementing the tightly coupled training protocol. This can be addressed by operating one SerDes in TX pass-through and the other in RX pass-through mode. The choice of TX or RX pass-through depends on the configuration as explained below. The details of RX pass-through and TX pass-through configurations are described further herein. The subject technology can be used with this standard specified protocol or used in a similar proprietary scheme.

Figure 2B:
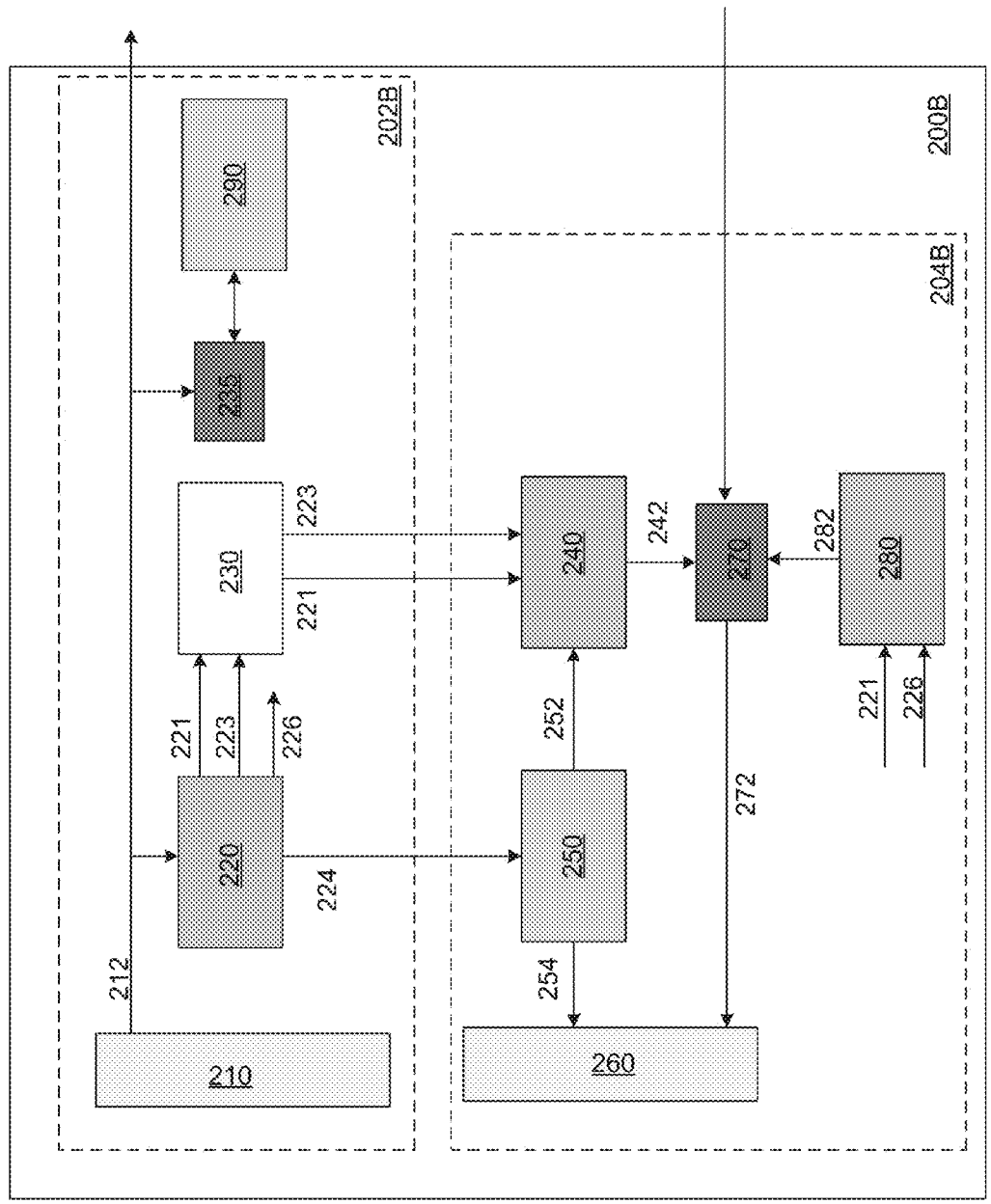
FIGS. 2B through 2C are block diagrams illustrating example architectures of an Ethernet device with remote TX training capability, in accordance with one or more implementations.
Figure 2C:
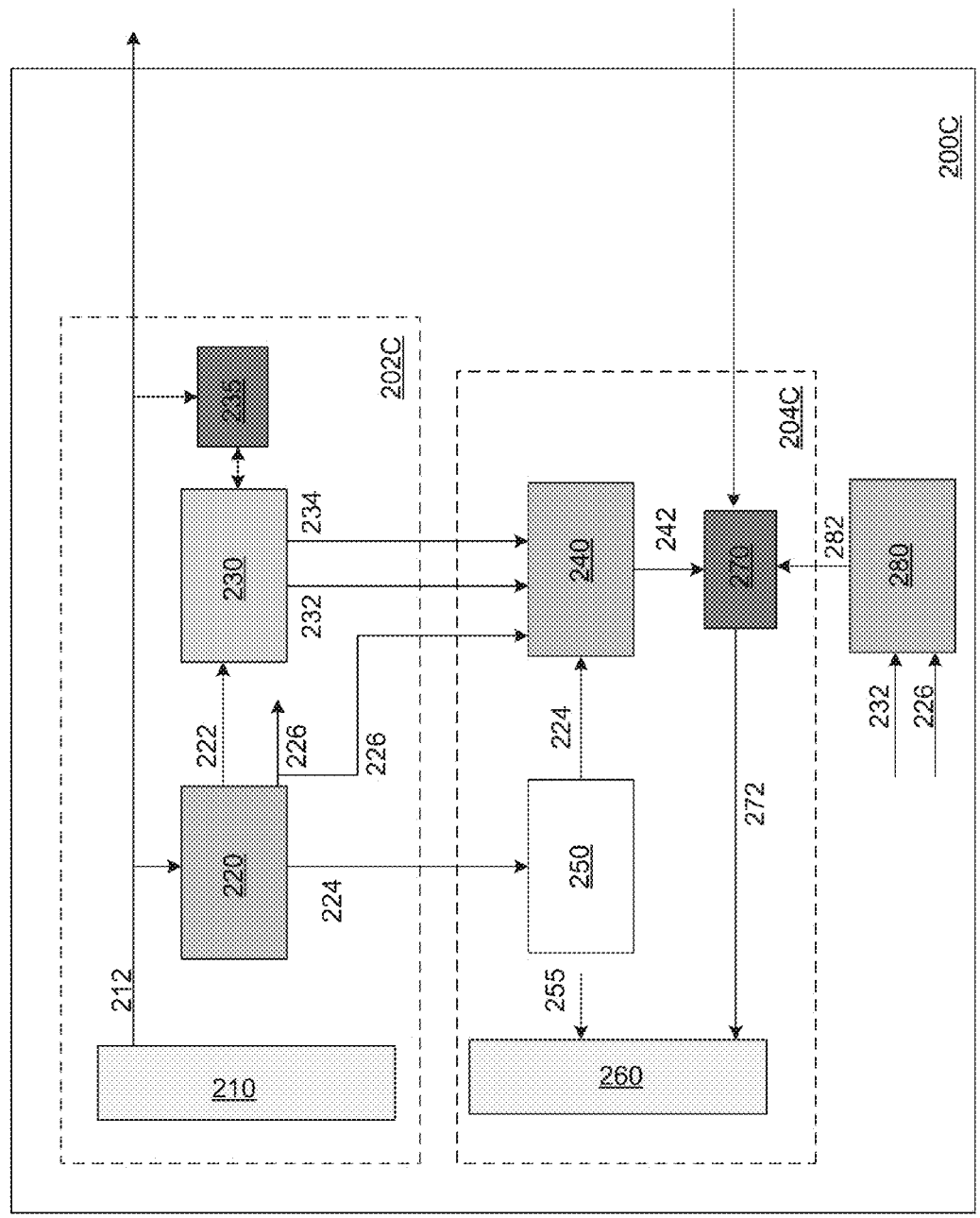

FIGS. 2B through 2C are block diagrams illustrating example architectures of Ethernet devices 200B and 200C with remote TX training capability, in accordance with one or more implementations of the subject technology. The Ethernet device 200B shown in FIG. 2B corresponds to a SerDes in the RX pass-through configuration. An RX block 202B and a TX block 204B of the Ethernet device 200B are similar to the corresponding blocks of the Ethernet device 200A of FIG. 2A, except for the RX tuning and feedback module 230 which is operating as a pass through microcode and the addition of the RX tuning microcode 290, which can be realized in digital logic circuitry or firmware.

In the configuration of FIG. 2B, the SerDes TX path communicate with the remote LP, but the RX path is receiving in-band information from another SerDes. This in-band information includes the local RX ready signal 221, the change request to the LP TX signal 223, and remote RX ready 226. In this configuration the Ethernet device 200B does not generate any TX FIR change requests (e.g., no C172/93 feedback code is generated). The pass through microcode 230 is used to transfer the in-band information to the appropriate destination. The RX tuning hardware 235, and the RX tuning microcode 290 are present to minimize RX BER, but do not interact with the link partner's TX.

The Ethernet device 200C shown in FIG. 2C corresponds to a SerDes in the TX pass-through configuration. An RX block 202C and a TX block 204C of the Ethernet device 200C are similar to the corresponding blocks of the Ethernet device 200A of FIG. 2A, except for a few differences in functionality of some modules as described herein. In the TX pass-through configuration, the SerDes RX path communicates with the remote LP, but the TX path sends in-band information to another SerDes. The in-band information includes the other receiver's local RX ready, the remote LP's change request to the local TX and remote RX ready. In this configuration the SerDes TX does not change its TX FIR, it passes the commands over to the next SerDes in the chain using a pass-through microcode.

In one or more implementations, the RX decoder module 220 sends the remote RX ready signal 226 to state machine 280 and the TX encoder module 240. The TX encoder module 240 encodes information derived from the remote RX ready signal 226, the local RX ready signal 232, and the change request to remote LP TX signal 234 and provides the encoded information to the MUX 270. The microcode of the TX FIR control 250 operates in a pass-through mode and does not change the LP's request to change local TX signal 224 and passes this signal to the TX encoder module 240. The TX AFE 260 is not coupled to the TX FIR control 250 and operates with fixed TX FIR control 255.

FIGS. 3A-3B illustrate examples of devices for TX training a remote link partner (LP), in accordance with one or more implementations of the subject technology. The device 300A includes a local port 315 (e.g., 200C of FIG. 2C), an RX retimer module 330, and a TX retimer module 340. The local port 315 includes a local RX block 310 and a local TX block 320. The local RX block 310 is similar to the RX block 202C of FIG. 2C, and the local TX block 320 is similar to the TX block 204C of FIG. 2C. The RX retimer module 330 and the TX retimer module 340 are features of the subject technology that, in one or more implementations, can be integrated with the Ethernet device 200C to extend its reach with full transparency to the remote LP. In one or more implementations, the RX retimer module 330 and the TX retimer module 340 are realized in a TX path of the Ethernet device 200C. For example, the TX retimer module 340 is realized adjacent to a TX port of the device 300A, and the RX retimer module 330 is realized adjacent to the TX retimer module 340.

In some implementations, the RX retimer module 330 and the TX retimer module 340 can be realized in a firmware-controlled scheme. During the startup of the device 300A, the local RX block 310 receives input control and status data 305 from a remote LP. The input control and status data 305 includes a command 302 to the local TX and a status signal 304, which includes a remote RX-ready status and a status of the LP TX. The local RX block 310 is transparent to the command 302 and generates a first control and status signal 325. The first control and status signal 325 includes the command 302 and a signal 322 including a local RX-ready status, a remote RX-ready status, and a command to the LP TX to adjust its TX quality.

The local TX block 320 copies the first control and status data 325 received from the local RX block 310 to the RX retimer module 330. Similarly, the RX retimer module 330 copies the first control and status signal 325 received from the local TX block 320 to the TX retimer module 340. The TX retimer module 340 generates second control and status data 345 for TX training of the remote LP. The second control and status data 345 includes a command to LP TX 342 and a status signal 344, which includes a local RX ready and a status of the local TX. After both the local TX and the retimer TX detect that local and remote receivers are ready, they switch to TX data traffic.

In one or more implementations, a device 300B for TX training of a remote LP includes a local port 355 (e.g., 200B of FIG. 2B), a TX retimer module 370, and an RX retimer module 380. The local port 355 includes a local TX block 350 and a local RX block 360. The local RX block 360 is similar to the RX block 202B of FIG. 2B, and the local TX block 350 is similar to the TX block 204B of FIG. 2B. The RX retimer module 370 and the TX retimer module 380 are features of the subject technology that, in one or more implementations, can be integrated with the Ethernet device 200B to extend its reach with full transparency to the remote LP. In one or more implementations, the RX retimer module 370 and the TX retimer module 380 are realized in an RX path of the Ethernet device 200B. For example, the RX retimer module 380 is realized adjacent to an RX port of the device 300B and the TX retimer module 370 is implemented adjacent to the RX retimer module 380.

The RX retimer module 380 receives first control and status data 307 from the remote LP and provides second control and status data 385. In one or more aspects, the first control and status data 307 includes one or more commands 306 from the remote LP, a status signal 308 including a status of the TX block of the remote LP, and a remote RX-ready status. The second control and status data 385 provided by the TX retimer module 380 includes one or more commands 306 and a status signal including a local RX-ready status, the remote RX-ready status, and one or more commands for the remote LP to adjust the quality of its TX signal.

The TX retimer module 370 copies the second control and status data 385 to the local RX block 360, which operates in a pass-through mode and copies the second control and status data 385 to the local TX block 350. In one or more implementations, the local TX block 350 generates third control and status data 355 for transmission to the remote LP. The third control and status data 355 includes one or more commands 352 for transmission to the remote LP and a status signal 354 including the status of the local TX block and a local RX-ready status. The commands to the remote LP includes instructions for the LP TX to adjust the taps of its FIR filter to enhance the quality of its TX signal. The status of the local TX block indicates to the remote LP the status of meeting the requests received from the remote LP by the local TX. The local RX-ready status indicates to the remote LP readiness of the local RX to receive signals from the remote LP.

FIGS. 4A-4B illustrate examples of methods 400A and 400B for TX training a remote LP in accordance with one or more implementations of the subject technology. For explanatory purposes, the blocks of the example methods 400A and 400B are described herein as occurring in serial, or linearly. However, multiple blocks of the example methods 400A and 400B can occur in parallel. In addition, the blocks of the example methods 400A and 400B need not be performed in the order shown and/or one or more of the blocks of the example methods 400A and 400B need not be performed.

The method 400A starts with receiving, at a receive (RX) retimer module (e.g., 330 of FIG. 3A), first control and status data (e.g., 325 of FIG. 3A), and copying the first control and status data to a TX retimer module (e.g., 340 of FIG. 3A) (410). In response to receiving the first control and status data, at the TX retimer module, second control and status data (e.g., 345 of FIG. 3A) is provided, based on the first control and status data, for TX training of the remote LP (420). The TX retimer module is adjacent to a TX port of a device (e.g., 300A of FIG. 3A), and the RX retimer module is adjacent to the TX retimer module.

The method 400B starts with receiving, at a receive (RX) retimer module (e.g., 380 of FIG. 3B), first control and status data (e.g., 307 of FIG. 3B) from the remote LP and providing second control and status data (e.g., 385 of FIG. 3B) based on the first control and status data (430). At a TX retimer module (e.g., 370 of FIG. 3B), the second control and status data is received and the second control and status data is copied to a local RX block (e.g., 360 of FIG. 3B) (440). The RX retimer module is adjacent to an RX port of a device (e.g., 300B of FIG. 3B), and the TX retimer module is adjacent to the RX retimer module.

Figure 5:
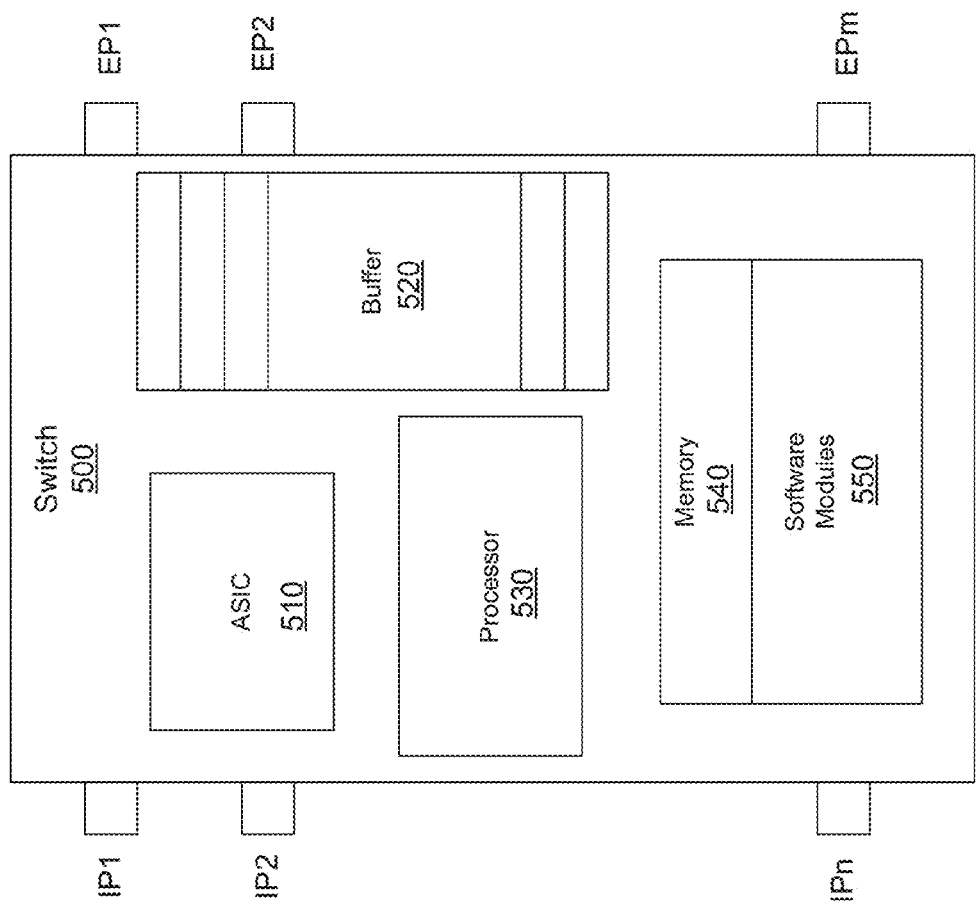
FIG. 5 illustrates an example of a communication device employing features of the subject technology in accordance with one or more implementations.

FIG. 5 illustrates an example of a communication device 500 employing features of the subject technology in accordance with one or more implementations of the subject technology. Examples of the communication device 500 includes an Ethernet switch of an Ethernet network such as a private network including a data-center network, an enterprise network, or other private networks. The communication device 500 includes a number of ingress (input) ports IP1-IPn and multiple egress (output) ports EP1-EPm. In one or more implementations, one or more of the ingress ports IP1-IPn of the can receive a data packet form another switch or and endpoint device of the network. The communication device 500 further includes a hardware component such as an application specific integrated circuit (ASIC) 510 (which in some embodiments can be implemented as a field-programmable logic array (FPGA)), a buffer 520, a processor 530, memory 540, and a software module 550.

In some implementations, the ASIC 510 can include suitable logic, circuitry, interfaces and/or code that can be operable to perform functionalities of a PHY circuit. The buffer 520 includes suitable logic, circuitry, code and/or interfaces that are operable to receive and store and/or delay a block of data for communication through one or more of the egress ports EP1-EPm. The processor 530 includes suitable logic, circuitry, and/or code that can enable processing data and/or controlling operations of the communication device 500. In this regard, the processor 530 can be enabled to provide control signals to various other portions of the communication device 500. The processor 530 also controls transfers of data between various portions of the communication device 500. Additionally, the processor 530 can enable implementation of an operating system or otherwise execute code to manage operations of the communication device 500.

The memory 540 includes suitable logic, circuitry, and/or code that can enable storage of various types of information such as received data, generated data, code, and/or configuration information. The memory 540 includes, for example, RAM, ROM, flash, and/or magnetic storage. In various embodiment of the subject technology, the memory 540 may include a RAM, DRAM, SRAM, T-RAM, Z-RAM, TTRAM, or any other storage media. The memory 540 can include software modules 550 that when executed by a processor (e.g., processor 530) can perform some or all of the functionalities of the ASIC 510. In some implementations, the software modules 550 include codes that when executed by a processor can perform functionalities such as configuration of the communication device 500.

In some implementations the communication device 500 can include the features of any of the devices 200B of FIG. 2B and 200C of FIG. 2C, and the simplex RX and TX retimers of the subject technology as shown in FIGS. 3A-3B may be implemented in the communication device 500 to extend its reach to a remote link partner and allow TX training of the remote link partner, as discussed above.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device for transmit (TX) training a remote link partner (LP), the device comprising:
   a TX retimer module coupled to a TX port of the device; and
   a receive (RX) retimer module coupled to the TX retimer module,
   wherein the RX retimer module is configured to copy first control and status data to the TX retimer module, wherein the TX retimer module is configured to provide second control and status data for TX training of the remote LP, wherein the first control and status data comprises one or more commands received from the remote LP, one or more commands for the remote LP, and status data relating to the remote LP and a local RX block of the device, and wherein the second control and status data comprises one or more commands for transmission to the remote LP and status data including a status of the local TX block and a local RX-ready status to indicate that the local RX block is ready for receiving data traffic.

2. The device of claim 1, further comprising a local TX block configured to provide the first control and status data to the RX retimer module.

3. The device of claim 2, wherein the local TX block is configured to receive the first control and status data from a local RX block of the device and to operate in a pass through mode with respect to the received first control and status data.

4. A device for transmit (TX) training a remote link partner (LP), the device comprising:
   a receive (RX) retimer module coupled to an RX port of the device; and
   a TX retimer module coupled to the RX retimer module,
   wherein the TX retimer module is configured to receive first control and status data from the remote LP and to provide second control and status data, wherein the TX retimer module is configured to pass through the second control and status data, wherein the first control and status data comprises one or more commands received from the remote LP, one or more commands for the remote LP, and a status of a TX block of the remote LP, and a remote RX-ready status, and wherein the second control and status data comprises the one or more commands from the remote LP, a local RX-ready status, a remote RX-ready status, and one or more commands for the remote LP.

5. The device of claim 4, further comprising a local TX block configured to receive the second control and status data from a local RX lock and to provide a third control and status data.

6. The device of claim 5, wherein the third control and status data comprises one or more commands for a TX block of the remote LP, a status of the local TX block, and a local RX-ready status.

7. A method for transmit (TX) training a remote link partner (LP), the method comprising:
   receiving, at a receive (RX) retimer module, first control and status data and copying the first control and status data to a TX retimer module; and
   in response to receiving the first control and status data, at the TX retimer module, providing second control and status data, based on the first control and status data, for TX training of the remote LP,
   wherein the TX retimer module is coupled to a TX port of a device, and wherein the RX retimer module is coupled to the TX retimer module, wherein the first control and status data comprises one or more commands received from the remote LP, one or more commands for the remote LP, and status data relating to the remote LP and a local RX block of the device, and wherein providing the second control and status data comprises providing one or more commands for transmission to the remote LP and status data including a status of the local TX block and a local RX-ready status to indicate that the local RX block is ready for receiving data traffic.

8. The method of claim 7, further comprising providing, by a local TX block, the first control and status data to the RX retimer module.

9. The method of claim 8, further comprising receiving, by the local TX block, the first control and status data from a local RX block of the device and copying the received first control and status data to the RX retimer module.

10. A method for transmit (TX) training a remote link partner (LP), the method comprising:
   receiving, at a receive (RX) retimer module, first control and status data from the remote LP and providing second control and status data based on the first control and status data; and
   receiving, at a TX retimer module, the second control and status data, and copying the second control and status data to a local RX block,
   wherein the RX retimer module is coupled to an RX port of a device, and wherein the TX retimer module is coupled to the RX retimer module, and wherein the first control and status data comprises one or more commands from the remote LP and a status of a TX block of the remote LP, and a remote RX-ready status, and wherein the second control and status data comprise providing one or more commands from the remote LP, a local RX-ready status, a remote RX-ready status, and one or more commands for the remote LP.

11. The method of claim 10, further comprising receiving, by a local TX block, the second control and status data from a local TX lock and providing a third control and status data.

12. The method of claim 11, wherein providing the third control and status data comprises providing one or more commands for a TX block of the remote LP, a status of the local TX block, and a local RX-ready status.

13. A system comprising:
   a first communication device; and
   a second communication device in communication with the first communication device,
   wherein the first communication device comprises:
      a first TX retimer module coupled to a TX port of the first communication device;
      and
      a first receive (RX) retimer module coupled to the TX retimer module,
      wherein the first RX retimer module is configured to copy first control and status data to the first TX retimer module, wherein the first TX retimer module is configured to provide second control and status data for TX training of the second communication device, and wherein the first control and status data comprises one or more commands received from the remote LP, one or more commands for the remote LP, and status data relating to the remote LP and the local RX block of the device, and wherein the second control and status data comprises one or more commands for transmission to the remote LP and status data including a status of the local TX block and a local RX-ready status to indicate that the local RX block is ready for receiving data traffic.

14. The system of claim 13, wherein the second communication device comprises:
   a second receive (RX) retimer module adjacent to an RX port of the second communication device; and
   a second TX retimer module adjacent to the second RX retimer module,
   wherein the second TX retimer module is configured to receive third control and status data from the first communication device and to provide fourth control and status data, and wherein the second TX retimer module is configured to pass through the fourth control and status data.

* * * * *